United States Patent [19]

Kimball

[11] Patent Number: 5,079,094
[45] Date of Patent: Jan. 7, 1992

[54] ARTICLE COMPRISING METAL SUBSTRATES BONDED WITH REACTIVE HOT MELT STRUCTURAL ADHESIVE AND PROCESS THEREOF

[75] Inventor: Michael E. Kimball, Westbrook, Me.

[73] Assignee: W. R. Grace & Co.-Conn., New York, N.Y.

[21] Appl. No.: 564,484

[22] Filed: Aug. 8, 1990

Related U.S. Application Data

[62] Division of Ser. No. 199,491, May 27, 1988, Pat. No. 4,962,138.

[51] Int. Cl.$^5$ .............. B32B 15/08; C08L 63/02
[52] U.S. Cl. .................. 428/416; 428/450; 156/307.3; 156/330; 523/428; 523/451; 523/454
[58] Field of Search ............... 428/416, 450; 156/307.3, 330

[56] References Cited

U.S. PATENT DOCUMENTS 4,962,138 10/1990 Kimball .................. 428/416

Primary Examiner—P. C. Sluby
Attorney, Agent, or Firm—Charles A. Cross

[57] ABSTRACT

Reactive hot melt structural adhesives comprising urethane oligomer and epoxy mixture in specified ratios. The compositions offer very high shear, peel, and impact strengths, properties of particular value in bonding adherends in an auto body assembly line.

22 Claims, No Drawings

ARTICLE COMPRISING METAL SUBSTRATES BONDED WITH REACTIVE HOT MELT STRUCTURAL ADHESIVE AND PROCESS THEREOF

This is a division, of application Ser. No. 199,491, filed May 27, 1988, now U.S. Pat. No. 4,962,138.

FIELD OF THE INVENTION

The invention relates to reactive hot melt compositions (RHM's) useful as adhesives, sealants, coatings, or the like.

DESCRIPTION OF THE PRIOR ART

RHM's are thermosetting adhesives. These materials are known in the prior art, and are known to have various disadvantages.

Canadian Patent 1,229,192 of Nov. 10, 1987, to S.C. Lin, describes an RHM comprising an epoxy urethane containing compound, which thermosets on heating. U.S. Pat. No. 3,723,568 teaches the use of polyepoxides and optional epoxy polymerization catalysts. U.S. Pat. No. 4,122,073 teaches thermosetting resin obtained from polyisocyanates, polyanhydrides and polyepoxides. Crosslinking in these patents is achieved by reaction with available sites in the base polymers. U.S. Pat. No. 4,137,364 teaches crosslinking of an ethylene/vinyl acetate/vinyl alcohol terpolymer using isophthaloyl, bis-caprolactam or vinyl triethoxy silane whereby crosslinking is achieved before heat activation with additional crosslinking induced by heat after application of the adhesive. U.S. Pat. No. 4,116,937 teaches a further method of thermal crosslinking by the use of polyamino bis-maleimide class of flexible polyimides, which compounds can be hot melt extruded up to 150° C. and undergo crosslinking at elevated temperatures thereabove. In these latter two patents, thermal crosslinking is also achieved by reactions of the particular crosslinking agent with available sites of the base polymers.

U.S. Pat. No. 3,505,283 teaches the use of simple, organic di-and polyisocyanates as chemical thickeners when reacted with hydroxyl-containing epoxy resins at temperatures between 50° and about 200° C. in the presence of carboxylic acid anhydride as a curing agent. Material prepared from this process is not suitable as a reactive, hot melt adhesive since the high application temperatures required to afford processability may trigger the crosslinking reaction of the thermosetting material prematurely. Similarly, U.S. Pat. No. 3,424,719 teaches the use of simple diisocyanates to react with the glycidyl polyether of dihydric phenols in solvents, thereby increasing the crosslinking density which results in improved heat distortion temperatures. The solvent is necessary for processability of the solid forms of glycidyl polyether dihydric phenol and avoid the high temperature conditions required for polymerization which creates not only process problems but also may induce instability of the reactant mixture after blending with a latent curing agent.

OBJECTS OF THE INVENTION

Strong structural adhesives and sealants are needed for bonding substrates loaded with significant mechanical stress at the interface. Such adhesive materials must have the following requirements:

High production rates with short, unvarying times for each operation in assembly line use.

Minimal prior cleaning of surfaces to be bonded.

Minimal health and safety hazards.

Optimum balance between open time and development of handling strength.

Maximum bond strength.

Maximum thermal and environmental resistance.

Based on these requirements, typically thermosetting materials such as epoxy resins, phenolics, polyesters, and polyurethanes are used as structural adhesives. After the crosslinking reaction the adhesive becomes part of the structural component and provides the required bond strength and thermal resistance. Normally, the structural adhesive is composed of liquid resins and curing agents in either two-package or single package form depending on the reactivity between the resin and the curing agent under storage conditions.

The liquid structural adhesive has the advantage of easy application to the substrate over the solid adhesive. However, the liquid adhesive, in two-package form after mixing, has a certain length of pot-life which is the time required to stay as liquid for application purposes. Consequently, the handling strength (minimum strength necessary to maintain adhering substrates together) cannot be rapidly developed. Further, from a safety and health hazard viewpoint, the liquid adhesive usually causes more contamination of the work place than the solid form. Thus, the two-package structural adhesive requires a very precise measurement and extremely good mixing to obtain any consistency of property control.

The one package liquid adhesive was designed to solve mixing and metering difficulties. To achieve one package reactive adhesive preparation, techniques such as chemical blocking and phase separation are being used in the adhesive industry. The crosslinking reaction has to be triggered by heating or other techniques which are difficult to control resulting in long time periods to develop handling strength.

Two forms of solid adhesives, powder and hot melt can be used instead of liquid adhesives. Because of the phase separation between resin powder and curing agent powder, the one package adhesive can be obtained very easily. However, the application, handling cost and safety considerations make the powder adhesive less attractive to the adhesive industry.

The other solid form of adhesive is hot melt which is a thermoplastic in general. The hot melt adhesive provides a bond between substrates upon cooling the molten adhesive to room temperature. The bonding process is fast and simple. The disadvantage of a thermoplastic hot melt adhesive is the fast decrease in its bonding strength upon reheating because of the nature of thermoplastics. Thus, it cannot be considered as a structural adhesive unless it is further modified.

Conventional solid adhesive such as high molecular weight epoxy resin can be applied as a reactive hot melt adhesive. Without modification, this type of solid adhesive provides poor adhesion properties such as impact resistance and lap shear strength. Modification of this material such as reacting it with a carboxyl-terminated poly(butadiene-co-acrylonitrile) increases the impact resistance and the lap shear strength. However, this modification is carried out at elevated temperature, 100°-150° C., in the presence of a catalyst, thus making the addition of a latent curing agent such as dicyandiamide and curing accelerator difficult since the curing reaction is activated by the catalyst at room temperature. Hence, due to the combination of a high cost factor and preparation difficulties, this type of adhesive is not attractive commercially.

This invention is concerned with the development of a class of reactive hot melt adhesives which will provide rapid development of handling strength and, also, maximum bond strength and thermal resistance as thermosetting adhesives. This invention also relates to a process to utilize the reaction between diisocyanates and hydroxyl groups of the diol and epoxy resin to prepare the reactive hot melt adhesives having latent curability, long storage life, internally modified adhesion properties and well controlled application rheology. The materials for the preparation of this particular reactive hot melt adhesive include a polyisocyanate, a hydroxyl-containing epoxy resin for introducing reactive pendent groups and a diol, preferably a difunctional primary alcohol, for improving the physical properties and for reducing the viscosity of the bulk polymerization medium. Optionally, a reactive plasticizer for reducing the viscosity of bulk polymerization and adjusting the application temperature can be added to the system.

One object of the instant invention is to produce a composition, usable as an adhesive, sealant or coating, which is solventless. Another object of the invention is to produce a composition which can be applied as a hot melt. Still another object of the instant invention is to produce a composition which is heat curable in a minimum time period. A further object of the invention is to produce a novel compound which in combination with a heat reactive epoxy curing agent will result in a thermoset coating, adhesive or sealant on heating. Yet another object of the invention is to produce a thermoplastic composition which can be applied as a hot melt and thereafter cured by a thermally triggered initiator to a thermoset adhesive, sealant or coating at a more elevated temperature. A further object of the instant invention is to produce one or more methods for making a thermoplastic composition which can be applied as a hot melt. Other objects will become apparent from a reading hereinafter.

DESCRIPTION OF THE INVENTION

My RHM composition is an improvement in single-package epoxy RHM adhesive where the composition contains the hardener or catalyst, which is dormant until heat-triggered, whereupon the composition then crosslinks and thermosets. The improvement is several fold, as compared with various commercial single-package RHM adhesives presently used in the auto industry, viz.:

| | Composition I (This invention) | Composition X[1] |
|---|---|---|
| Shear strength, psi[2] | 3000 | 1800 |
| Peel strength, pli[3] | 45–50 | 0 |
| Impact strength[4] | 60" lbs | 10" lbs |
| Green tack to oily metal | 30 sec. | 30 seconds |

[1] A single-package RHM adhesive used for auto door hemflanging, in current commercial use.
[2] Shear strength by ASTM D1002.
[3] Peel strength by ASTM D1876, modified by pulling at 0.5"/min.
[4] Impact strength (0.062 cold rolled steel), by General Motors test method.

DEFINITIONS

Epoxy resins

Those used in the invention are so-called DGEBA-type, i.e., reaction products of diglycidyl epoxide with Bis-phenol A. All are commercially available from Shell Chemical Co.

Epon-872 has the formula

where X is

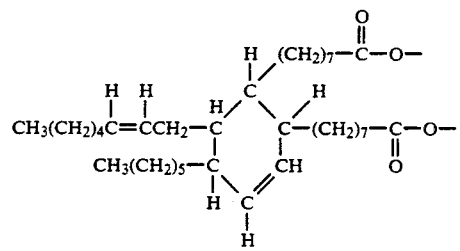

where R is —CH$_2$CH(OH)CH$_2$-

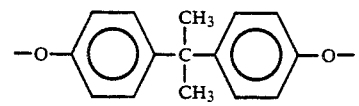

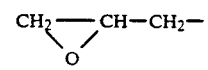

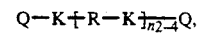

with 2.2 —OH groups/ molecule wherein n=2–4

Epon-828 is Q-K-Q, with 0.2 -OH groups/molecule, average MW, 350–400.

Other materials

NYAD-400; calcium silicate powder, from Nyco Co.
N-70-TS; fumed silica powder, from Cabot Co.
CK-2500; a non-heat reactive high melting phenolic resin from Union Carbide Corp. Softening point 235°-290° F.
A-187; glycidyl trimethyl silane, from Union Carbide Corp.
Olin 55-28 is a 4000 g/mole ethylene oxide endcapped polypropylene glycol triblock polymer, with primary hydroxyl groups: ---EO---PO---EO---.
Olin 20-28 is a 4000 g/mole polypropylene glycol homopolymer with secondary hydroxyl groups.
MP-102 (BASF) is a prepolymer made by adding tripropylene glycol to MDI to make a 50:50 MDI:MDI adduct which is liquid at room temperature.

| | Premix A | | |
|---|---|---|---|
| | Parts by Weight | | |
| Components | Broad Range | Narrow Range | Specific |
| Olin 55-28 | 5–100 | 20–25 | 22.80 |
| Olin 20-28[1] | 0–50 | 20–25 | 22.80 |
| Phenyldiethanolamine[2] | 0–2 | 0–1 | 0.47 |

-continued

| | Premix A | | |
|---|---|---|---|
| | Parts by Weight | | |
| Components | Broad Range | Narrow Range | Specific |
| MP-102[3] | 5–20 | 5–9 | 6.97 |
| Epon-1001F | 0–50 | 15–20 | 18.82 |
| Epon-872 | 10–50 | 26–30 | 28.14 |

[1]When the amount is zero, a more moisture sensitive compound is made.
[2]When the amount is zero, a softer polymer is made.
[3]Amount of MP-102 selected such that the ratio of molecular NCO to polyol —OH is greater than 1 but less than 2.

Premix A is a urethane oligomer and is used in TABLE I in the above specific amounts in preparing Composition I. It can be used in modifications of Composition I within the above ranges.

In preparing Composition I (TABLE I), the order of mixing is not critical. However, I prefer to add the dicyandiamide last, with mixing for a short time, to prolong shelf life.

TABLE I

| | Composition I | | |
|---|---|---|---|
| | Parts by Weight | | |
| | Broad Range | Narrow Range | Specific |
| Premix A | 50–800 | 100–300 | 250 |
| Epoxy mixture[1] | 10–500 | 50–400 | 200 |
| Epon-828 | 10–200 | 25–125 | 50 |
| CaSiO$_3$ | 0–200 | 50–150 | 100 |
| CaO | 10–100 | 25–75 | 50 |
| Fumed SiO$_2$ | 5–80 | 20–60 | 40 |
| CK-2500 Phenolic resin | 0–100 | 15–75 | 20 |
| Zn$_3$(PO$_4$)$_2$ | 5–100 | 5–50 | 10 |
| Dicy/Epoxy mix[2] | 50–150 | 60–120 | 80 |
| Glycidyl trimethyl silane | 1–10 | 3–7 | 5 |

[1]Epon-872, Epon-1001F, 3:1.
[2]Epon-828/dicyandiamide, 2:1.

When reference is made to Composition I, it is the Composition with the Specific amounts in TABLE I unless otherwise noted. Such Composition is preferred for use herein.

EXAMPLE 1

This example is partially hypothetical in that is is based on properties of my Composition I that I have established in the laboratory. Composition I use is demonstrated on a section of an auto assembly line, viz., an adhesive/sealant for door hem flange binding.

(1) Composition I at room temperature is a viscous liquid (a semi-solid). For application it must be heated, e.g., to 80° C., to liquefy it. At 80° C. it has zero strength and is easily handled. This temperature is too low to trigger the curing mechanism. Composition I at about 80° C. is applied around the interior rim of the outer plate (cold rolled steel - "CRS", optionally galvanized) of a car door. This application is preferably by spraying, but it can be by melt extrusion or other system.

(2) The inner plate (CRS) is now pressed ("fixtured") against the outer plate. One or both parts may be oily. In such case Composition I quickly penetrates the oil and forms an adhesive bond to the part. At this stage (room temperature) the Composition provides a strength of about 10 psi, enough to hold the two plates together under non-stress conditions.

(3) The flanges of the outer plate are now folded over the perimeter of the inner plate. In this operation, Composition I is squeezed into the flange crevices, providing a good seal all around the perimeter. The strength of the green adhesive at this stage is still about 10 psi.

(4) The door is assembled onto the metal body of the car. Here, if need be, the door can be bent and twisted to fit the automobile. If the adhesive bond is broken, possible sites for corrosion are not made because the adhesive softens in Step 6. At this stage the door is dimensionally stable because of the viscosity of the Composition (about 10 psi).

(5) The assembled car body is dipped into E-coat primer bath (a room-size vat). At this point many commercial adhesives tend to dissolve or be partially washed off into the primer baths and to redeposit on the car body surfaces. Composition I does not dissolve in these baths and hence avoids this problem. In this operation, Composition I has a strength of about 10 psi.

(6) The assembled body is removed from the E-bath and taken to the baking oven, where it is heated to about 350° F. (177° C.). Composition I at first melts and passes again through zero strength, then quickly begins to cure and soon attains its maximum strength, taking about thirty minutes for this. In its molten condition it spreads further into all cracks and crevices and ensures thorough coating and sealing between the two door plates, thereby minimizing future vapor/liquid penetration between the plates and consequent corrosion. A modification of Step 6 is discussed later on when I describe my Composition II.

The process outlined above has a general applicability. The substrates (adherends) are suitably metal parts. Parts such as refrigerator doors, stove and oven doors, parts for washers and driers, double-walled panels for vans and trucks, and hardware for marine, air, and rail vehicles and accessories can be assembled by my process, using the compositions of this invention. The invention compositions can also be used as gaskets, can sealants, and the like.

Referring now back to Stage (4) above, at this point parts adhered with conventional adhesives are customarily visually inspected. Frequently the parts will be very slightly out of true with respect to each other and/or to the car body framework. Manual adjustments (pounding, pulling, pressure) are made at this stage to bring the elements back into true. In current practice, using commercially available structural adhesives, this type of forcible adjustment tends to produce minute cracks in the adhesive, which is a semi-solid at this stage in the process (i.e., after application but before curing). Such cracks presage corrosion and eventual bond-failure. It would be a great advantage if the adhesive could momentarily cease to be a viscous solid and become a liquid with zero strength. My Composition I will in fact do exactly that. Thus, at 100°–160° C. Composition I melts but does not cure. Above 160° C. it cures. Thus, when heating to 180° C., the Composition must pass through 100°–160° C., so it softens.

This behavior provides a "window" within the process program which permits adjustments, and within which complete assemblies can be structured and/or restructured (i.e., the adherends can be moved with respect to each other). At temperatures below this window my Composition I is a semi-solid or viscous liquid, with very low adhesive strength (ca. 10 psi). At the window, the strength is zero. At temperatures substantially above he window temperature, Composition I will cure, solidify, and develop maximum strength.

Composition II

For assembly lines where Stage (6) above requires something between zero strength and a small but useful strength (e.g., 10 psi), I modify Composition I to Composition II. Composition II is like Composition I in that it is sufficiently liquid to withstand minor adherend adjustments without rupture or development of cracks. On the other hand, it is sufficiently viscous to provide a strength of about 1 psi at the curing temperature (177° C.), which is helpful in maintaining dimensional stability of the bonded adherends, especially where the Composition is affixed around the entire perimeter of the door or like part. Like Composition I, Composition II can be used to provide two metal substrates having between them the respective composition in uncured molten condition at a temperature of about 80°-150° C.

Composition II is a moisture-curing RHM adhesive, and is described below.

TABLE II

| | Composition II Parts by Weight | | |
|---|---|---|---|
| | Broad Range | Narrow Range | Specific |
| Premix A | 200–1000 | 400–600 | 500 |
| CKOO36 Phenolic[(1)] | 5–50 | 10–30 | 18.5 |
| CaCO$_3$ powder | 0–200 | 50–150 | 111 |
| Fumed Silica | 0–50 | 15–25 | 22.2 |
| Dicy/Epoxy Mix[(2)] | 5–50 | 15–25 | 22.2 |
| Schiff base[(3)] | 5–50 | 15–25 | 22.2 |
| Glycidyl trimethyl silane | 1–10 | 1–5 | 3 |

[(1)]A non-heat reactive high melting phenolic resin from Union Carbide corp., with a softening point of about 190–235° F.
[(2)]Epon-828/dicyandiamide wt. ratio: 2:1
[(3)]The Schiff base reacts with atmospheric moisture to regenerate the component amine and aldehyde or Ketone. The amine then catalyzes the cure. Substantially any Schiff base is suitable. The adduct of methyl isobutyl ketone and ethylene diamine is useful and cheap, and is available from Shell Chemical Co. as "H-2" (trademark).

the specific formulation in Table II gave a shear strength of 800 psi and peel strength of 10 pli, by ASTM procedures, supra.

The two Compositions (I and II) described in Tables I and II are species of the broader genus set forth in Table III.

TABLE III

| Reactive Hot Melt Adhesives | |
|---|---|
| Component | Parts by Weight |
| Premix A | 50–1000 |
| Epon-872/Epon-1001F, 3:1 | 10–500 |
| Epon 828 | 10–200 |
| Calcium Silicate (1) | 0–200 |
| CaO (2) | 0–100 |
| Fumed silica (1) | 0–80 |
| Phenolic resin | 5–100 |
| Zn$_3$(PO$_4$)$_2$ | 5–100 |
| Epon-828/dicyandiamide, 2:1 | 5–150 |
| Glycidyl trimethyl silane | 1–10 |
| Schiff base (2) | 0–50 |
| Calcium carbonate powder (1) | 0–200 |

(1) Provided that the total of calcium silicate, fumed silica, and calcium carbonate is in the range of about 10–30 (preferably about 20) weight % of the total composition. The amount of fillers is needed to modify the rheology of the liquid mixture and to reinforce the cured product.
(2) When Schiff base is present, CaO is zero, and vice versa. CaO is present to remove all moisture in the composition, whereas Schiff base reacts with atmospheric moisture to regenerate component amine (which is a catalyst) and ketone or aldehyde.

Variations

The use of Epon-1001 F is not critical. Various other Epons are useful, e.g., Epon-836, which is: a Bis-phenol A adduct with Epon 828, viz., QKRKQ, where Q, K, and R are as above defined.

Celanese-5132 (a trimer acid adduct) may be used in whole or in part for Epon-872 (though I prefer the latter).

Substantially any polyisocyanate can be used, substituting in whole or in part for MDI, viz.:

Diisocyanates such as hexamethylene diisocyanate, m-phenylene diisocyanate, 2,4-toluene diisocyanate, 4,4'-diphenylmethane diisocyanate, dianisidine diisocyanate, tolidine isocyanate, isophorone diisocyanate, 4,4-dicyclohexylmethane, chlorophenylene-2,4-diisocyanate, 1,5-naphthalene diisocyanate, ethylene diisocyanate, diethylidene diisocyanate, propylene-1,2-diisocyanate, cyclohexylene-1,2-diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, and furfurylidene diisocyanate.

Triisocyanates such as biuret of hexamethylene diisocyanate and triphenylmethane triisocyanate.

Polyisocyanates such as polymeric diphenylmethane diisocyanate.

Heating

The heating step to cure the epoxy, urethane containing, hot melt adhesive compounds to thermoset materials is usually carried out for a period of 10 seconds to 30 minutes at a temperature of 100°-300° C., preferably 150°-200° C., which is sufficient to fully cure the composition to a solid thermoset adhesive, coating or sealant.

The heating step to cure the compound can be accomplished in several ways. In simple adhesive systems, the composition can be applied by manual means to an adherend, contacted with another adherend and the assembled systems heated in a forced air oven until a thermoset bond results.

I claim:

1. Article comprising two metal substrates wherein therebetween is a composition comprising in parts by weight:
   (1) Premix A, 50–1000 parts;
   (2) Epoxy resin mixture consisting of epoxy resin B and epoxy resin C in a weight ratio of about 3:1, 10–500 parts;
   (3) Epoxy resin D, 10–200 parts;
   (4) Calcium silicate powder, 0–200 parts;
   (5) Only one member of the group consisting of CaO and a Schiff base, wherein if CaO is used, 10–100 parts and if a Schiff base is used, 5–50 parts;
   (6) Fumed silica, 0–80 parts;
   (7) Phenolic resin, softening point 190°–290° F., non-heat reactive, 5–100 parts;
   (8) Zn$_3$(PO$_4$)$_2$, 5–100 parts;
   (9) Mixture, about 2:1 by weight, of Epoxy resin D and dicyandiamide, 5–150 parts;
   (10) Glycidyl trimethyl silane, 1–10 parts;
   (11) CaCO$_3$ powder, 0–200 parts;
   where Premix A comprises in parts by weight,
   (i) about 4000 g/mole ethylene oxide end-caped polypropylene glycol triblock copolymer containing primary —OH groups, 5–100 parts;
   (ii) about 4000 g/mole polypropyleneglycol homopolymer, with secondary —OH groups, 0–50 parts;
   (iii) phenyl diethanolamine, 0–2 parts;

(iv) about 50:50 weight diphenylmethane diisocyanate/tripropylene glycoldiphenyl methane diisocyanate adduct, 5-20parts, the amount being further selected such that the molecular ratio of —NCO/(-polyol—OH) is greater than 1 and less than 2 wherein the hydroxyl groups are from the polyols found in (i), (ii) and (iii) above;
(v) Epoxy resin C, 0–50 parts;
(vi) Epoxy resin B, 10–50 parts; where Epoxy resin B is

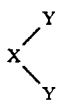

where
X is .

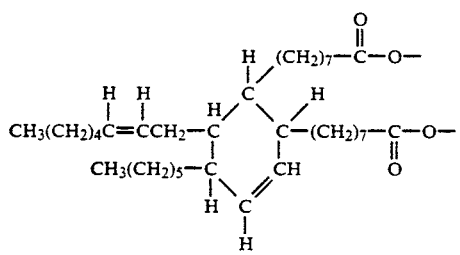

Y is —R—K—Q
R is —CH$_2$CH(OH)CH$_2$—
K is

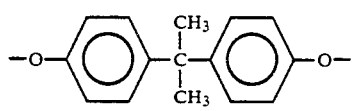

Q is

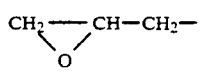

Epoxy resin C is Q-K-[-R-K-]$_n$-Q wherein n=2-4;
Epoxy resin D is Q-K-Q and
provided that the total of calcium silicate, fumed silica, and calcium carbonate is in the range of about 10-30 weight % of the total composition.

2. Article according to claim 1, wherein the composition comprises, in parts by weight:
(1) Premix A, 50–800 parts;
(2) The mixture of epoxy resins B and C, 10–500 parts;
(3) Epoxy resin D, 10–200 parts;
(4) Calcium silicate, 0–200 parts;
(5) CaO, 10–100 parts;
(6) Fumed silica, 5–80 parts;
(7) Phenolic resin, softening point 235°-290° F., 5-100 parts;
(8) Zn$_3$(PO$_4$)$_2$, 5-100 parts;
(9) Epoxy resin D/dicyandiamide mixture, 50-150 parts;
(10) Glycidyl trimethyl silane, 1-10 parts; and
(11) CaCO$_3$ powder, 0.

3. Article according to claim 1 wherein the composition comprises, in parts by weight:
(1) Premix A, 50–800 parts;
(2) The mixture of epoxy resins B and C, 50–400 parts;
(3) Epoxy resin D, 25–125 parts;
(4) Calcium silicate, 50–150 parts;
(5) CaO, 25–75 parts;
(6) Fumed silica, 20–60 parts;
(7) Phenolic resin, 15–75 parts;
(8) Zn$_3$(PO$_4$)$_2$, 5–50 parts;
(9) Epoxy resin D/dicyandiamide mixture, 60–120 parts;
(10) Glycidyl trimethyl silane, 3–7 parts; and
(11) CaCO$_3$ powder, 0 parts.

4. Article according to claim 1 wherein the composition comprises, in parts by weight:
(1) Premix A, in parts by weight 50–800 parts;
(2) The mixture of epoxy resins B and C, 200 parts;
(3) Epoxy resin D, 50 parts;
(4) Calcium silicate, 100 parts;
(5) CaO, 50 parts;
(6) Fumed silica, 40 parts;
(7) Phenolic resin, 20 parts;
(8) Zn$_3$(PO$_4$)$_2$, 10 parts;
(9) Epoxy resin D/dicyandiamide mixture, 80 parts;
(10) glycidyl trimethyl silane, 5 parts; and
(11) CaCO$_3$ powder, 0 parts.

5. Article according to claim 1 wherein (1) comprises 100-300 parts.

6. Article according to claim 1 wherein (1) comprises 250 parts.

7. Article according to claim 1 wherein the composition consists essentially of, in parts by weight:
(1) Premix A, 200-1000 parts;
(2) Fumed silica, 0-50 parts;
(3) Phenolic resin, softening point 190°-235° F.; 0-50 parts;
(4) Epoxy resin D/dicyandimide mixture, 5-50 parts;
(5) Glycidyl trimethyl silane, 1-10 parts;
(6) Schiff base, 5-50 parts; and
(7) Calcium carbonate, 0-200 parts;
wherein Premix A comprises in parts by weight,
(i) about 4000 g/mole ethylene oxide end-capped polypropylene glycol triblock copolymer containing primary —OH groups, 5-100 parts;
(ii) about 4000 g/mole polypropylene glycol homopolymer, with secondary —OH groups, 0-50 parts;
(iii) phenyl diethanolamine, 0-2 parts;
(iv) about 50:50 weight diphenylmethane diisocyanate/tripropylene glycoldiphenyl methane diisocyanate adduct, 5-20 parts, the amount being further selected such that the molecular ratio of NCP/polyol —OH is greater than 1 and less than 2;
(v) Epoxy resin C, 0-50 parts;
(vi) Epoxy resin B, 10 -50 parts; where Epoxy resin B is

where
X is:

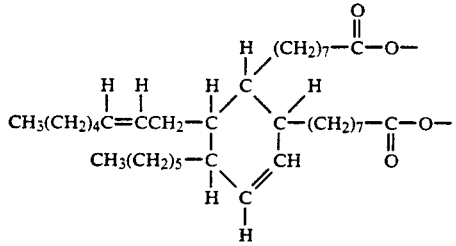

Y is —R—K—Q
R is —CH$_2$CH(OH)CH$_2$—
K is

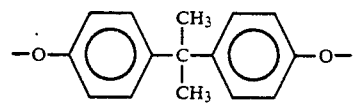

Q is

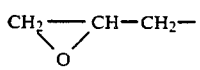

Epoxy resin C is Q—K—[—R—K—]$_n$—Q wherein n=2-4

Epxoy resin D is Q—K—Q; and provided that the total of fumed silica and calcium carbonate is in the range of about 10-30weight % of the total composition.

8. Article according to claim 7 wherein the composition consists essentially, in parts by weight:
  (1) Premix A, 400-600 parts;
  (2) Fumed silica, 15-25 parts;
  (3) Phenolic resin, 10-30 parts;
  (4) Epoxy resin D/dicyandiamide mixture, 15-25 parts;
  (5) Glycidyl trimethyl silane, 1-5 parts;
  (6) Schiff base, 15-25 parts; and
  (7) Calcium carbonate, 50-150 parts.

9. Article according to claim 8 wherein the composition consists essentially, in parts by weight:
  (1) Premix A, 500 parts;
  (2) Fumed silica, 22.2 parts;
  (3) Phenolic resin, 18.5 parts;
  (4) Epoxy resin D/dicyandiamide mixture, 22.2 parts;
  (5) Glycidyl trimethyl silane, 3 parts;
  (6) Schiff base, 22.2 parts; and
  (7) Calcium carbonate, 111 parts.

10. Article according to claim 1 wherein the composition between the substrates is in an uncured molten condition at a temperature of about 80°-150° C.

11. Article according to claim 1 wherein the composition between the two substrates forms a bond and is in an uncured molten to semi-molten state, has a shear strength of about 0-10 psi and a temperature of about 80°-160° C.; and wherein the two substrates are movable with respect to each other without loss of the bond.

12. Article according to claim 1 wherein in addition the article comprising the two substrates and the composition therebetween has been coated.

13. Process of adhering two substrates together comprising the sequential steps of (A) heating to melt, but not cure, an adhesive composition comprising
  (1) Premix A, 50-1000 parts;
  (2) Epoxy resin mixture consisting of epoxy resin B and epoxy resin C in a weight ratio of about 3:1, 10-500 parts;
  (3) Epoxy resin D, 10-200 parts;
  (4) Calcium silicate powder, 0-200 parts;
  (5) only one member of the group consisting of CaO and a Schiff base, wherein if CaO is used, 0-100 parts and if a Schiff base is used, 0-50 parts;
  (6) Fumed silica, 0-80 parts;
  (7) Phenolic resin, softening point 190°-290° F., non-heat reactive, 5-100 parts;
  (8) Zn$_3$(PO$_4$)$_2$, 5-100 parts;
  (9) Mixture, about 2:1 by weight, of Epoxy resin D and dicyandiamide, 5-150 parts;
  (10) Glycidyl trimethyl silane, 1-10 parts;
  (11) CaCO$_3$ powder, 0-200 parts; where Premix A comprises in parts by weight,
    (i) about 4000 g/mole ethylene oxide end-capped polypropylene glycol triblock copolymer containing primary —OH groups, 5-100 parts;
    (ii) about 4000 g/mole polypropylene glycol homopolymer, with secondary —OH groups, 0-50 parts;
    (iii) phenyl diethanolamine, 0-2 parts;
    (iv) about 50:50 weight diphenylmethane diisocyanate/tripropylene glycoldiphenyl methane diisocyanate adduct, 5-20 parts, the amount being further selected such that the molecular ratio of -NCP/(polyyo—OH) is greater than 1 and less than 2 wherein the hydroxyl groups are from the polyols found in (i), (ii) and (iii) above;
    (v) Epoxy resin, C, 0-50 parts;
    (vi) Epoxy resin, B, 10-50 parts; where Epoxy resin B is

where
X is

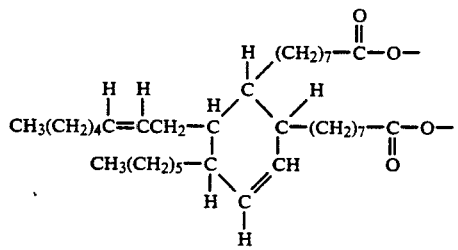

Y is —R—K—Q
R is —CH$_2$CH(OH)CH$_2$—
K is

Q is

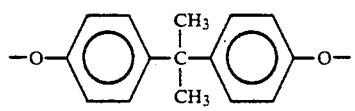

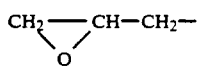

Epoxy resin C is Q—K—[—R—K—]$_n$—Q wherein n=2-4;

Epoxy resin D is Q-K-Q and provided that the total of calcium silicate, fumed silica, and calcium carbonate is in the range of about 10-30 weight % of the total composition;

(B) applying the heated adhesive composition to a metal substrate;

(C) contacting a second metal substrate with the adhesive composition so as to form a bond between the two assembled substrates; and (D) heating the bonded substrates at a temperature of 150°-200° C. to cure the adhesive composition.

14. Process according to claim 13 wherein, between steps (C) and (D), the process further comprises the following additional steps:
(C-1) integrating the bonded substrates into an apparatus; and
(C-2) coating the apparatus.

15. Process according to claim 13 or 14 wherein the adhesive composition comprises, in parts by weight:
(1) Premix A, 50-800 parts;
(2) The mixture of epoxy resins B and C, 10-500 parts;
(3) Epoxy resin D, 10-200 parts;
(4) Calcium silicate, 0-200 parts;
(5) CaO, 10-100 parts;
(6) Fumed silica, 5-80 parts;
(7) Phenolic resin, softening point 235°-290° F., 5-100 parts;
(8) Zn$_3$(PO$_4$)$_2$, 5-100 parts;
(9) Epoxy resin D/dicyandiamide mixture, 50-150 parts;
(10) glycidyl trimethyl silane, 1-10 parts; and
(11) CaCO$_3$ powder, 0.

16. Process according to claim 13 or 14 wherein the adhesive composition comprises, in parts by weight:
(1) Premix A, 50-800 parts;
(2) The mixture of epoxy resins B and C, 50-400 parts;
(3) Epoxy resin D, 25-125 parts;
(4) Calcium silicate, 50-150 parts;
(5) CaO, 25-75 parts;
(6) Fumed silica, 20-60 parts;
(7) Phenolic resin, 15-75 parts;
(8) An$_3$(PO$_4$)$_2$, 5-50 parts;
(9) Epoxy resin d/dicyandiamide mixture, 60-120 parts;
(10) Glycidyl trimethyl silane, 3-7 parts; and
(11) CaCO$_3$ powder, 0 parts.

17. Process according to claim 13 or 14 wherein the adhesive composition comprises, in parts by weight:
(1) Premix A, 50-800 parts;
(2) The mixture of epoxy resins B and C, 200 parts;
(3) Epoxy resin D, 50 parts;
(4) Calcium silicate, 100 parts;
(5) CaO, 50 parts;
(6) Fumed silica, 40 parts;
(7) Phenolic resin, 20 parts;
(8) Zn$_3$(PO$_4$)$_2$, 10 parts;
(9) Epoxy resin d/dicyandiamide mixture, 80 parts;
)10) Glycidyl trimethyl silane, 5 parts; and
(11) CaCO$_3$ powder, 0 parts.

18. Process according to claim 13 or 14 wherein (1) of said composition comprises 100-300 parts.

19. Process according to claim 13 or 14 wherein (1) of said composition comprises 250 parts.

20. Process according to claim 13 or 14 wherein the adhesive composition consists essentially of, in parts by weight:
(1) Premix A, 200-1000 parts;
(2) Fumed silica, 0-50 parts;
(3) Phenolic resin, softening point 190°-235° F., 0-50 parts;
(4) Epoxy resin D/dicyandiamide mixture, 5-50 parts;
(5) glycidyl trimethyl silane, 1-10 parts;
(6) Schiff base, 5-50 parts; and
(7) Calcium carbonate, 0-200 parts;
wherein Premix A comprises in parts by weight,
(i) about 4000 g/mole ethylene oxide end-capped polypropylene glycol triblock copolymer containing primary —OH groups, 5-100 parts;
(ii) about 4000 g/mole polypropylene glycol homopolymer, with secondary —OH groups, 0-50 parts;
(iii) phenyl diethanolamine, 0-2 parts;
(iv). about 50:50 weight diphenylmethane diisocyanate/tripropylene glycoldiphenyl methane diisocyanate adduct, 5-20 parts, the amount being further selected such that the molecular ratio of NCO/polyol —OH is greater than 1 and less than 2;
(v) Epoxy resin C, 0-50 parts;
(vi) Epoxy resin B, 10-50 parts; where Epoxy resin B is

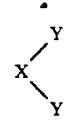

where X is

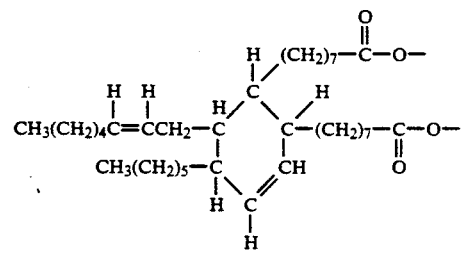

Y is —R—K—Q
R is —CH$_2$CH(OH)CH$_2$—
K is

Q is

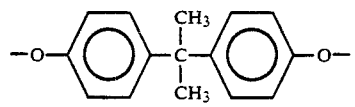

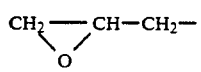

Epoxy resin C is Q—K—[—K—K—]$_n$—Q
wherein n=2-4

Epoxy resin D is Q—K—Q; and provided that the total of fumed silica and calcium carbonate is in the range of about 10-30 weight % of the total composition.

21. Process according to claim 20 wherein the adhesive composition consists essentially of, in parts by weight:
 (1) Premix A, 400-600 parts;
 (2) Fumed silica, 15-25 parts;
 (3) Phenolic resin, 10-30 parts;
 (4) Epoxy resin D/dicyandiamide mixture, 15-25 parts;
 (5) Glycidyl trimethyl silane, 1-5 parts;
 (6) Schiff base, 15-25 parts; and
 (7) Calcium carbonate, 50-150 parts.

22. Process according to claim 21 wherein the adhesive composition consists essentially of, in parts by weight:
 (1) Premix A, 500 parts;
 (2) Fumed silica, 22.2 parts;
 (3) Phenolic resin, 18.5 parts;
 (4) Epoxy resin D/dicyandiamide mixture, 22.2 parts;
 (5) Glycidyl trimethyl silane, 3 parts;
 (6) Schiff base, 22.2 parts; and
 (7) Calcium carbonate, 111 parts.

* * * * *

UNITED STATES PATENT AND TRADEMARK OFFICE
CERTIFICATE OF CORRECTION

PATENT NO. : 5,079,094

DATED : January 7, 1992

INVENTOR(S) : Michael E. Kimball

It is certified that error appears in the above-identified patent and that said Letters Patent is hereby corrected as shown below:

Claim 13, Column 12, line 38, delete "-NCP", and add-- NCO --.

Claim 16, Column 13, line 59, delete "An$_3$" and add -- Zn$_3$ --.

Signed and Sealed this

Thirtieth Day of March, 1993

Attest:

STEPHEN G. KUNIN

*Attesting Officer*     *Acting Commissioner of Patents and Trademarks*